Oct. 9, 1928.
L. BERTELE
1,687,193
CINEMATOGRAPHIC PROJECTION APPARATUS WITH OPTICAL COMPENSATION
Filed Nov. 19, 1927
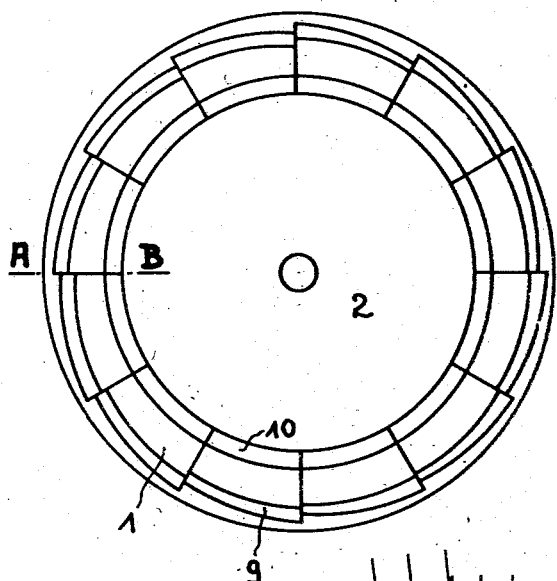
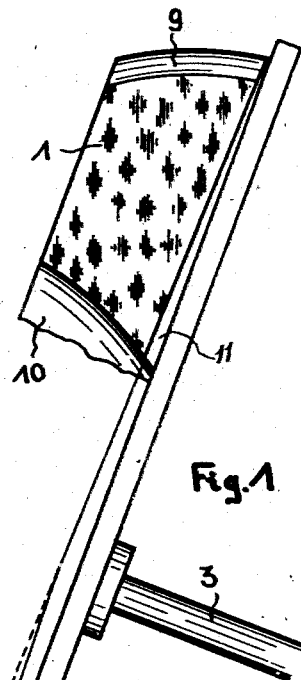
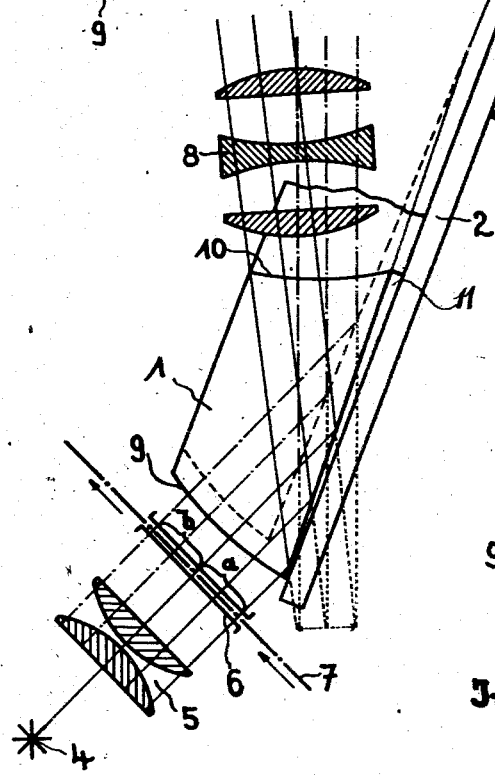
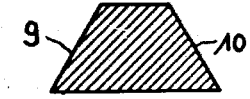
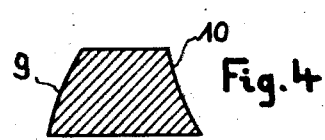

Patented Oct. 9, 1928.

1,687,193

UNITED STATES PATENT OFFICE.

LUDWIG BERTELE, OF DRESDEN, GERMANY.

CINEMATOGRAPHIC PROJECTION APPARATUS WITH OPTICAL COMPENSATION.

Application filed November 19, 1927, Serial No. 234,529, and in Germany October 16, 1926.

This invention relates to an apparatus for compensating the picture movement in a cinematographic projection apparatus in which the film moves continuously. The present apparatus is especially characterized by the original configuration and position of the several compensating elements.

Figure 1 schematically shows the device in position between the film and the objective.

Figure 2 shows the optical compensating element viewed from above.

Figures 3 and 4 show cross sections on the line A—B of Figure 2.

The disk 2, which carries the optical compensating elements 1, rotates during the operation of the apparatus around an axis 3. The light rays coming from the source light 4 pass to a condenser 5 which transmits them upon the film 7 passing through the film window 6. The compensating bodies 1 carried upon the disk 2 move near the film 7 in operation. The light rays are reflected by these compensating bodies and then pass to the objective 8 by which they are thrown upon a screen.

Each compensating element consists of a glass prism with a light reflecting base. They are so positioned upon the disk 2 that their bases form an acute angle with the surface of the disk in the direction of the circumference. The glass compensating elements can be held in inclined position by any suitable means. The glass wedge shaped means 11 shown in the drawing serves the purpose very well. By rotation of the disk 2 the reflecting surface of each compensating element becomes farther from and near to the surface of the disk 2. As a result of this motion, the rays of light which fall upon the light reflecting surface of the compensating elements are caused to rise and fall and then pass to the objective 8. The picture produced by the objective 8 upon a screen remains still; the movement is therefore compensated.

Upon the entry of another film picture in the film window another of the compensating elements comes into operative position and produces again the compensation of the motion of the picture.

The surfaces 9 and 10 of the compensating elements, through which the light enters and leaves, are optically ground or polished in order to produce the above described paths of the light rays. These optically prepared surfaces may be conical, toric or spherical.

As a consequence of the rising and falling of the light reflecting surfaces of the compensating elements, the light path between the film and the objective is periodically altered during rotation of the disk, whereby the screen picture becomes sharp and unsharp. In order to overcome this disadvantageous alteration of the light path, the glass path for the light in the compensating element is made of different lengths. This is attained by having the polished optical surfaces 9 and 10 approach each other towards one end, that is to say these surfaces are inclined to each other at an acute angle. (See Fig. 2.)

In Figure 1 the path of the rays is shown in the initial and final position of the compensating element. The compensating element is shown in the figure in the initial position by means of full lines and in the end position by means of broken lines.

The film picture $a$ may be assumed to be before the picture window 6 which is twice as high as a picture. Light passes through this picture and travels to the light reflecting base of the compensating element. In consequence of the total reflection which it experiences upon this surface, it passes to the objective 8. While the film moves in the film window 6 in the direction of the arrow indicated in the drawing, and the picture moves to the position $b$, the disk 2 with its compensating elements rotates and equalizes the motion of the picture, in that the reflecting surface rises and accompanies the travel of the film picture.

Where in the claims I use the terms "curved, prismatic refractors" I wish it to be understood that I designate refracting prisms as shown and described, which may have conical, toric or spherical surfaces, or any combination of these, on their inner and outer circumferences.

Having described my invention what I claim is:

1. A cinematographic apparatus for optical compensation of the movement of a film picture comprising a rotatable disk having a plurality of reflecting surfaces disposed annularly thereof, and curved, prismatic refractors each having varying effective optical distances carried by the disk to render the effective path of rays of light passing through the film of constant length.

2. A cinematographic apparatus for optical compensation of the movement of a constantly moving film, comprising a rotatable disk having a plurality of reflecting surfaces disposed annularly thereof, and curved, prismatic refractors, each having varying effective optical distances, mounted on the disk, said refractors compensating for the varying linear distance from a film picture to a screen.

3. A cinematographic apparatus for optical compensation of the movement of a film picture, comprising a rotatable disk having a plurality of reflecting surfaces disposed annularly thereof, each of said reflecting surfaces being disposed at an acute angle with the surface of said disk, and curved, prismatic refractors each having varying effective optical distances carried by said disk and disposed one over each of said reflecting surfaces to render the effective path of rays of light passing through the film of constant length.

In witness whereof I have hereunto set my hand.

LUDWIG BERTELE.